INVENTOR.
ROGER B. STONE
BY Ronald Zibelli
Franklyn C. Weiss
ATTORNEYS

May 19, 1970 R. B. STONE 3,513,447

BIT SYNC RECOVERY SYSTEM

Filed Sept. 1, 1967 7 Sheets-Sheet 2

INVENTOR
ROGER B. STONE

BY Ronald Zibelli
Franklyn C. Weiss
ATTORNEYS

May 19, 1970 R. B. STONE 3,513,447

BIT SYNC RECOVERY SYSTEM

Filed Sept. 1, 1967 7 Sheets-Sheet 3

INVENTOR.
ROGER B. STONE

BY Ronald Zibelli
Franklyn C. Weiss
ATTORNEYS

INVENTOR.
ROGER B. STONE
BY Ronald Zibelli
Franklyn C. Weiss
ATTORNEYS

INVENTOR.
ROGER B. STONE
BY Ronald Zibelli
Franklyn C. Weiss
ATTORNEYS

INVENTOR.
ROGER B. STONE
BY Ronald Zibelli
Franklyn C. Weiss
ATTORNEYS

INVENTOR.
ROGER B. STONE
BY Ronald Zibelli
Franklyn C. Weiss
ATTORNEYS

United States Patent Office 3,513,447
Patented May 19, 1970

3,513,447

BIT SYNC RECOVERY SYSTEM

Roger B. Stone, Webster, N.Y., assignor to Xerox Corporation, Rochester, N.Y., a corporation of New York Filed Sept. 1, 1967, Ser. No. 665,211
Int. Cl. G06f 1/04
U.S. Cl. 340—172.5 11 Claims

ABSTRACT OF THE DISCLOSURE

A bit sync recovery system for use in recovering the phase of synchronous digital data. The slicing level crossings at the output of a frequency demodulator are utilized in conjunction with a local clock to accurately determine the information sampling times. The local clock at a predetermined multiple of the baud rate is utilized to insert or subtract a pulse from the clock wave train in order to shift the baud clock to a predetermined amount.

BACKGROUND

In the frequency modulating technique known as frequency shift keying, data transmission is accomplished by assigning a different carrier frequency to each of the data, i.e., mark and space, and transmitting the appropriate frequency for a period of time sufficient to assure reliable detection. The technique may be extended to include frequency transmission of data information with more than the normal two level mark and space frequencies. That is, in a multilevel data transmission system employing frequency shift keying, a plurality of frequencies would be transmitted, one frequency for each level in the data waveform.

Transmission of the frequency modulated or frequency shift keyed signal in a facsimile or other type of system, for example, may be accomplished over any of the known transmission media, such as telephone lines, microwave installations and direct wire. At a receiving location the frequency modulated signals must be demodulated and detected in order to obtain the original transmitted information. A prior art technique of recovering bit timing at a receiving location is by the transmission of a pilot tone with the data information or by the use of a clock signal transmitted over a parallel transmission line. These prior art techniques, while effective, substantially decrease the amount of information that may be transmitted across a band limited line, as in the case of the pilot tone; while the transmission of a separate clock signal requires the use of a separate transmission line thereby unnecessarily increasing the expense of transmitting information and decreasing line availability. At it is desirable to transmit as much information as a line will carry for maximum efficiency and decreased cost, it is apparent that such prior art techniques do not maximize the economic capability of the transmission system.

OBJECTS

It is, accordingly, an object of the present invention to provide an improved digital data bit sync recovery system.

It is another object of the present invention to increase the efficiency of a data transmission system utilizing frequency shift keying.

It is another object of the present invention to improve the demodulation and detection of frequency shift keyed signals.

It is another object of the present invention to recover the phase of a synchronous clock in a synchronous digital data transmission system.

BRIEF SUMMARY OF THE INVENTION

In accomplishing the above and other desired aspects, applicant has invented new and improved methods and apparatus for accurately recovering the synchronization of transmitted synchronous digital data. A local master clock at the receiving location is utilized to generate the local baud rate signal by the use of divide-down timing chains. At a multiple of the baud rate in the divide-down chain, a pulse adder or deleter circuit is inserted to allow a pulse to be either added or deleted from the clock pulse wave train. This action has the effect of shifting the phase of the baud clock by the reciprocal of the multiple of the baud rate at the point which the circuit was added in the divide-down chain. By the use of a transition pulse counter to count the number of slicing levels that the input data signal crosses and by other decision logic circuitry, the required pulse can be added or deleted from the divide-down clock wave train in order to shift the baud rate clock the desired amount. In this way subsequent decision and detection circuitry can be used to sample the input digital data to recover the transmitted information.

DESCRIPTION OF THE DRAWINGS

For a more complete understanding of the invention, as well as other objects and further features thereof, reference may be had to the following detailed description in conjunction with the drawings wherein.

DETAILED DESCRIPTION OF THE INVENTION

Figure 1:
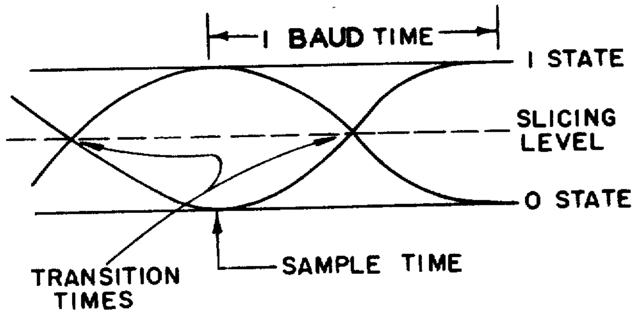
FIG. 1 is a representative diagram of the ideal two-level eye pattern.

In a frequency shift keyed data transmission system the output of the demodulator circuit is a series of signals between the level limits of the particular system. Thus, in a two level data system, the output from the demodulator circuit will be a wave train of signals, alternating between the one and zero states, i.e., mark and space, depending upon the digital information therein. If all the possible transitions from one level to another could be viewed, the resultant figure would look like that as shown in FIG. 1. Because of the nature of the curve, it can be seen why the name "eye" is given to the pattern.

The demodulator circuit, however, only returns the signal to a state that subsequent detection circuits can use to recover the transmitted data. Thus, when such synchronous digital data is transmitted, there is need for a technique at the receiver to recover the synchronization with the transmitter in order to accurately detect the transmitted information. If no other information is transmitted along with the data to indicate the phase of the transmitted signals, a technique at the receiver must be included in order that all the information that was transmitted actually be detected. The function of a bit sync recovery circuit, therefore, is to recover the phase of the synchronous clock which is located at the transmitter. See "Data Transmission" by Bennett and Davey, Mcgraw-Hill Book Comypany, 1965, page 261.

The present invention is utilized to predict when the optimum sample time will occur, given the approximate baud rate of the incoming signal. The times when the digital signals in a two level system cross the slicing levels, i.e., the transition times, are ideally one-shalf the baud time from the optimum sample time. These transition times can be used to adjust the sample time clock at the receiver; but, of course, transitions do not occur every baud time, and those of which do occur may be somewhat displaced in time due to the effects of noise, inter-symbol interference, etc.

Figure 2:
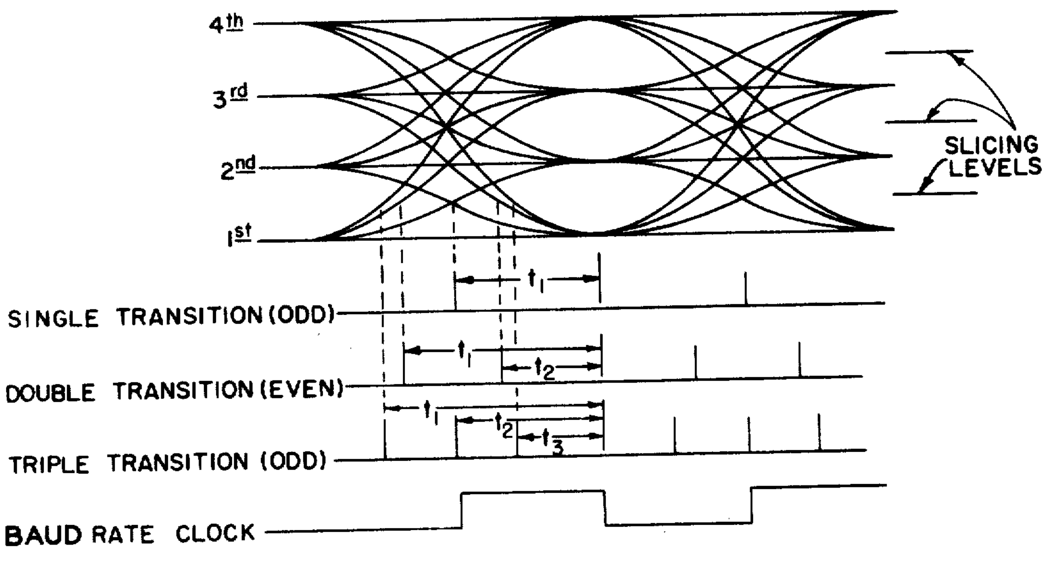
FIG. 2 is a representative diagram of the four-level eye pattern and associated slicing levels.

If a system consists of more than two levels (symbols), the same information is available, but the situation becomes more complex since additional slicing levels are introduced and more than one slicing level may be crossed in one baud time. An illustration for the four level case is shown in FIG. 2. For the single transistion and triple transitions per baud the center transition could be used as a reference as in the single transistion case, but additional information is contained in the positions of the other transitions.

When an even number of transitions occurs in a baud, as for the double transition case in FIG. 2, some other criterion must be used if the information contained in these transitions is to be utilized. This invention proposes in multilevel systems to average the time position of the transitions in a baud. At the receiving location, then, a local clock must be generated at the receiver and adjusted to approximately the baud rate of the transmitter, T. The times, $t_i$, are measured for the K transitions in a baud, as determined by the local baud clock. The equation $$T_L=\frac{\sum_{i=1}^{K} t_i}{K}$$

is computed. If $$T_L\neq\frac{T}{2}$$

the phase of the local clock is shifted in the direction to reduce $$\left|\frac{T}{2}-T_L\right|$$

To reduce the effect of noise and intersymbol interference, $T_L$ must be averaged over several bauds. It is noted that if no transitions occur, i.e., $K=0$, no action is taken.

Figure 3:
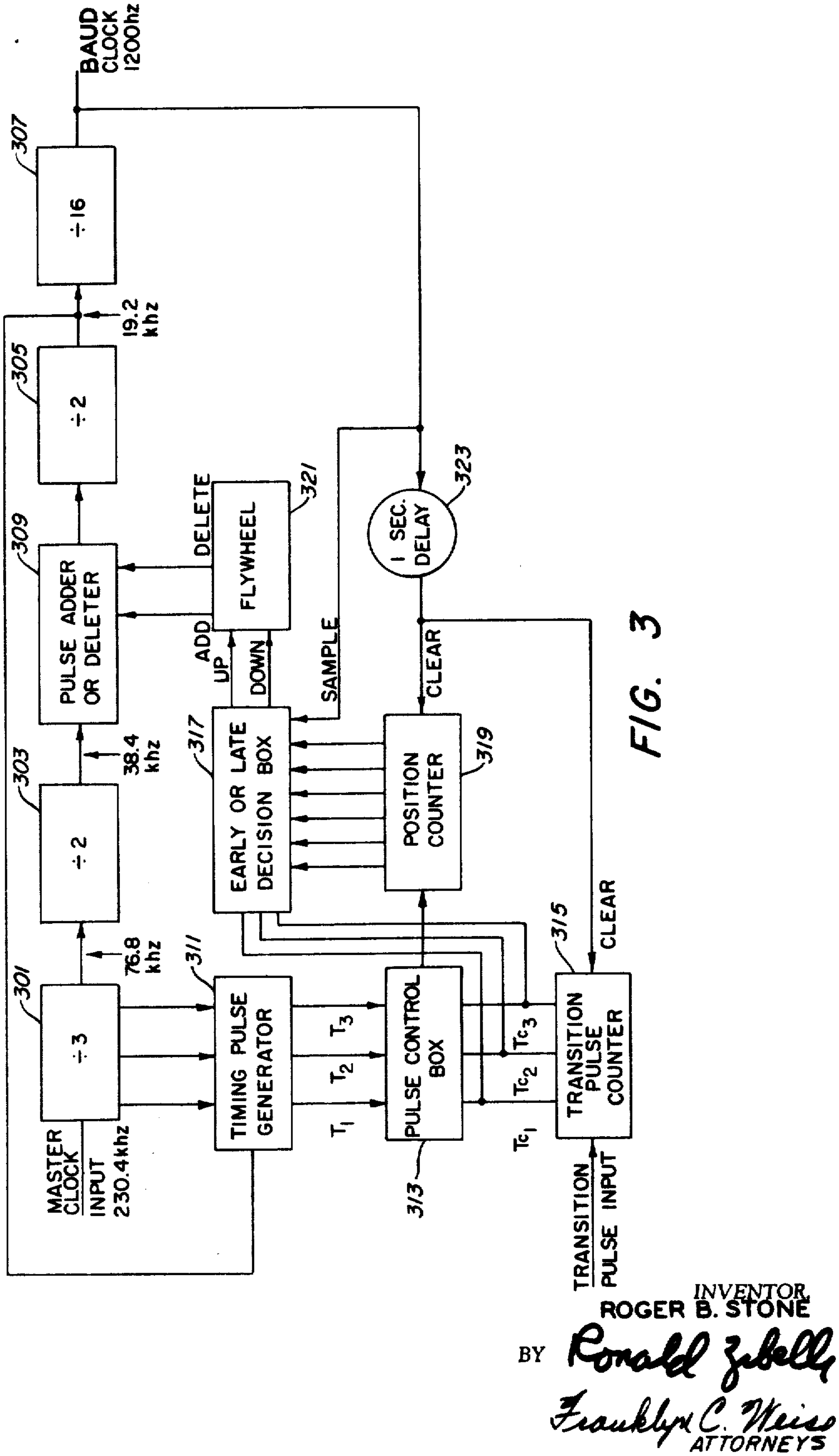
FIG. 3 is a block diagram of the entire system in accordance with the principles of the present invention.

A block diagram of the invention incorporating the above operations, is shown in FIG. 3. If, for example, the baud rate was 1200 Hz., the master clock input would be a signal of 230.4 kHz., as from a crystal clock. A divide chain, comprising divide networks 301, 303, 305, and 307, divide the 230.4 kHz. signal down to the 1200 Hz. signal, the baud rate. Divide network 301 divides the master clock input by three to generate a 76.8 kHz. signal for application to divide by two network 303. The 38.4 kHz. signal from divide by two network 303 is presented to the pulse added or deleter circuit 309 for presentation to divide by two network 305. Out of the divide by two network 305 is a 19.2 kHz. signal for application to divide by 16 network 307 which generates the 1200 Hz. baud rate. Thus, it can be seen that at 32 times the baud rate on the divide down chain the pulse adder or deleter circuit 309 is inserted in the chain which allows a pulse to be either added to or deleted from the wave train. This action has the effect of shifting the phase of the baud clock by 1/32 of a baud.

At this point it must be understood that the clock rates as shown and described in conjunction with FIG. 3 are exemplary only as a different baud rate and thus a different master clock frequency can be utilized. Along the same line, therefore, different divide networks could be utilized to shift the phase of the baud clock by any predetermined number within the limits of the divide networks.

The timing pulse generator 311 is coupled to the divide by three network 301 in conjunction with the 19.2 kHz. signal from divide by two network 305 to generate signals $T_1$, $T_2$, and $T_3$. It is not really necessary for the timing pulse generator 311 to be tied to the divide by three network 301, but it is a convenient place from which to draw a signal of fixed height and width. Thus, pulse $T_1$ would be a pulse equal to a positive half cycle of the 230.4 kHz. master clock input signal, pulse $T_2$ would be the next 230.4 kHz. positive half cycle signal in time relation, while $T_3$ would be a third 230.4 kHz. positive half cycle signal in time relation. The transition pulse counter 315 monitors the slicing transitions from slicers ahead in the circuit, not shown. Signal $T_{C_1}$ would be a first transition count, while $T_{C_2}$ would be the second transition count, while $T_{C_3}$ would be the third transition count within one baud time. These output signals are transferred to the pulse control circuit 313 in addition to the early or late decision circuit 317.

Thus, the measurement of $t_i$, as hereinbefore set forth, takes place in the position counter 319. That is, at the beginning of a baud time, as determined by the local clock, the position counter 319 and the transition pulse counter 315 are reset by the baud clock through the one microsecond delay 323. When the first transition occurs at at the input to transition pulse counter 315, pulses at 16 times the baud clock rate are passed into the position counter 319. The pulses are transferred at 16 times the baud rate, as the timing pulse generator 311 is controlled by the 19.2 kHz. signal, which is at 16 times the baud clock rate at divide network network 307. If second and third transitions occur, as when two or three slicing levels are crossed, a second and third set of pulses are added to the first and counted by the position counter 319.

In the single transition case, if the position counter 319 contains the count of 8 when it is sampled by the local baud clock at the end of the baud, the proper phase relation exists between the local baud clock and the incoming signal. That is, pulses are coming into the position counter 319 at 16 times the baud rate clock. If the position counter contains the count of 8 when it is sampled by the local baud clock, then the sampling operation which takes place further on in the circuit is operating at the center of the baud, which as seen in conjunction with FIG. 1 is the proper sampling time. If the number in the position counter 319 is a count other than 8, then the transition detection denotes that sampling would occur at a position other than the middle of the baud and is an indication that the phase relationship is wrong and that some corrective action should be taken to return the sampling time to the middle of the baud. As this out of range indication could be the result of noise or intersymbol interference affecting the position of the transition, a flywheel circuit 321 is provided to average over these effects. The flywheel is driven by the early or late decision circuit 317 which determines that the position counter 319 has counted signals other than the proper middle of the baud indication. The early or late decision box 317 pulses the flywheel circuit 321 up or down accordingly, which acts as a buffer between the decision circuit 317 and the pulse circuit 309.

Figure 8:
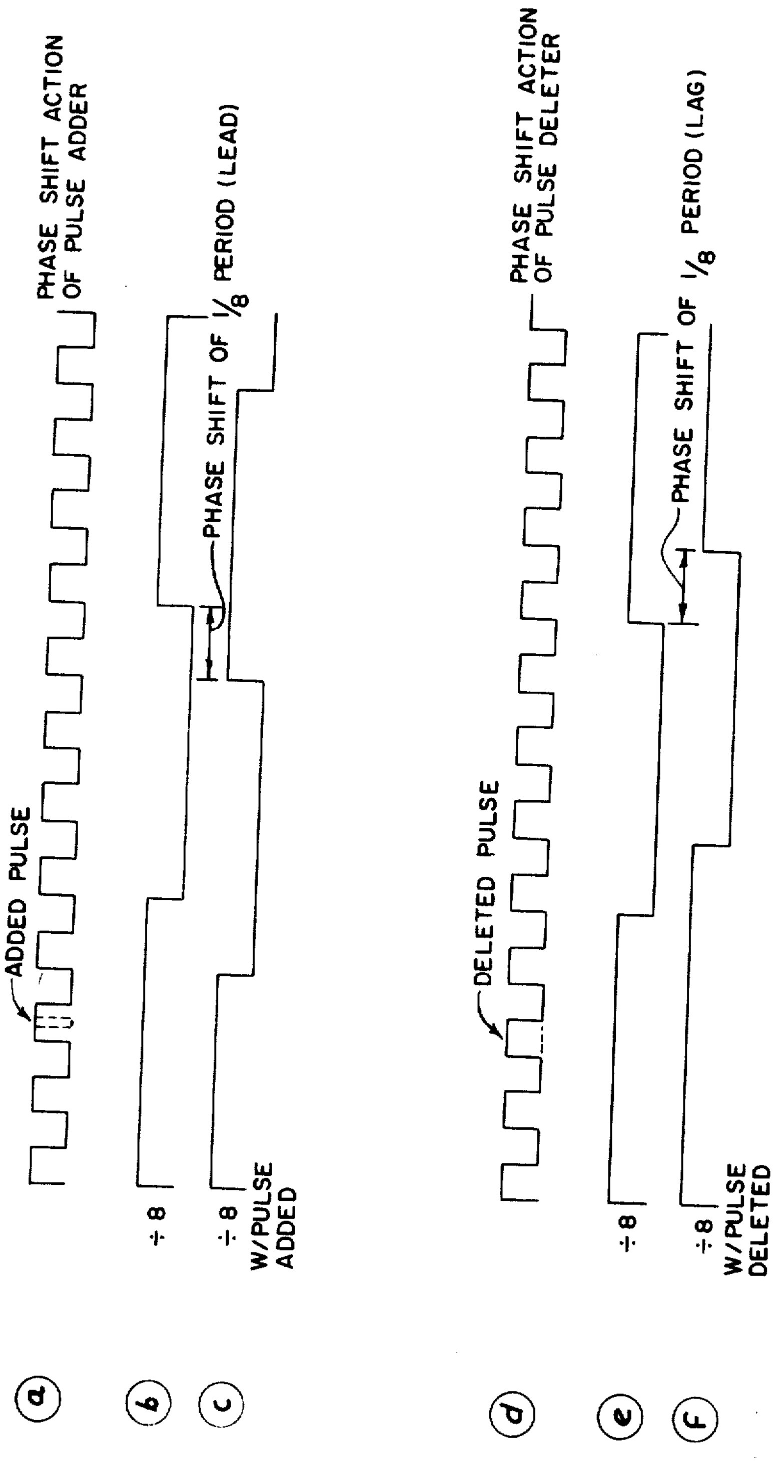
FIG. 8 are representative curves showing the addition or deletion of a pulse in the baud rate clock.

The flywheel circuit 321 is effectively a counter circuit which may be counted up or down by proper input signals. At the upper and lower limits of the flywheel circuit, upon enabling by the occurrence of a number of early or late decisions, an add or delete pulse is sent to the pulse adder or deleter circuit 309 to add or delete the pulse in the baud clock wave train. FIG. 8 shows the addition and subtraction of the pulse from the pulse adder or deleter circuit 309. At FIG. 8*a* is shown the addition of a pulse which adds another edge in the squarewave signal which, when divided by two at network 305 and by 16 by network 307, shifts the phase the predetermined amount.

For purposes of illustration, this amount is ⅛ of a baud. FIG. 8*b* shows the baud clock as it is presented to the pulse adder or deleter circuit 309, while FIG. 8*c* shows the baud clock from the output thereof shifted ⅛ of a period.

FIGS. 8*d*, 8*e*, and 8*f* show the effect of deleting a pulse from the baud clock wave train, which deletes one edge in the clock wave train. After operation by the subsequent divide networks the phase of the clock is shifted ⅛ of a period as a lag.

Rather than provide circuitry to divide the contents of the position counter by two or three in the two or three transition cases, a different in-range reason is gated in for each of these cases. For the two transition case allowance must be made for the possibility that the position counter might contain an odd number when double pulsing begins, making it impossible for the result to be 16. Similarly, for the three transition case allowance must be made for the possibility that the position counter contents might not be divisible by three at the onset of triple pulsing. The logic at which the specific circuits are operated is as follows.

For the pulse control logic, if no transitions occur no sgnal is passed; if one transition occurs, signal $T_1$ is passed; if two transitions occur, signals $T_1$ and $T_2$ are passed; if three transitions occur, signals $T_1$, $T_2$, and $T_3$ are passed.

The early or late decision logic is as follows. When a sampling pulse occurs, if no transitions occur, no signal is passed; if one transition occurs and the position counter is less than 8, the down line is pulsed, if the position counter is more than 8, the up line is pulsed, or if two transitions occur and the pulse counter is less than 15, the down line is pulsed, while if the position counter is more than 17, the up line is pulsed; or if three transitions occur and the pulse counter is less than 23, the down line is pulsed, while if the position counter is more than 25, the up line is pulsed.

As hereinbefore set forth, the flywheel circuit 321 is utilized to remove the possibility that noise or inter-symbol interference is affecting the position of the slicing transitions. Thus, the flywheel logic works as follows. If the count is +3 and an up pulse is received, the add line is pulsed and the flywheel cleared. If the count is −3 and a down pulse is received, the delete line is pulsed and the flywheel cleared. If the count is −3 through +2 and an up pulse is received, the flywheel is counted up one. If the count in the flywheel is −2 through +3 and a down pulse is received, the flywheel is counted down one. The above numbers are exemplary only for the case of the flywheel logic and the early or late decision logic in that any number range could be utilized in conjunction with adding or deleting a pulse from a baud clock.

Figure 4:
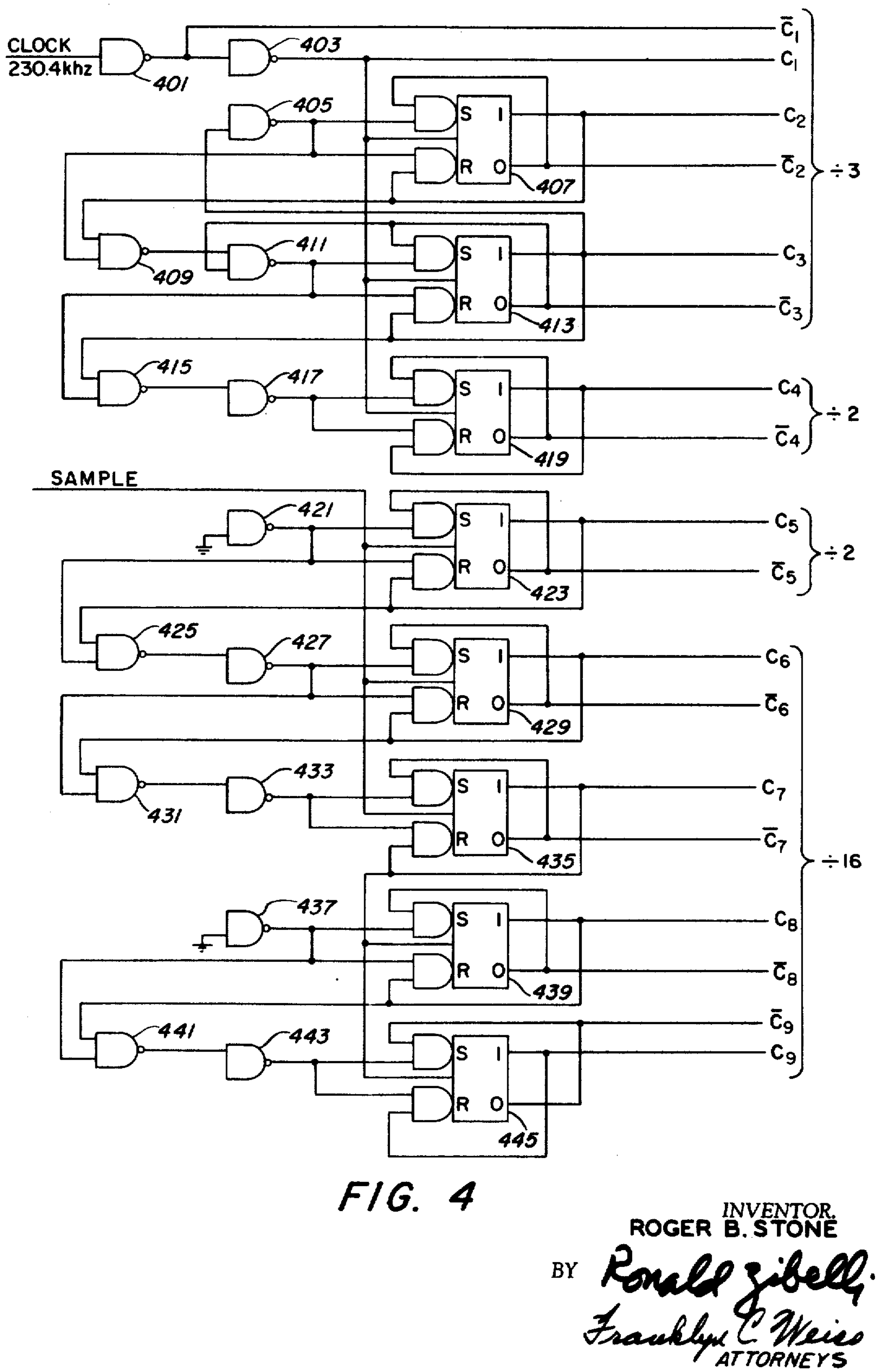
FIG. 4 is a logic diagram of the bit sync clock divider.

In FIG. 4 is shown the divide down networks shown as circuits 301, 303, 305, and 307 in FIG. 3. The divide by 3 network 301 comprises flip-flop 407 and 413 in FIG. 4. The master clock input at 230.4 kHz. is presented to gate 401. The output of this gate is $\overline{C}_1$ signal for application to subsequent circuitry. The output of gate 403 is the $C_1$ signal which is applied to flip-flops 407 and 413 in addition. Gates 405, 409, and 411 comprise the operating circuitry of the divide network which operates in a conventional manner. Signals $C_2$ and $\overline{C}_2$ are the outputs from flip-flop 407; while signals $C_3$ and $\overline{C}_3$ are the outputs from flip-flop 413. The divide by two network 303 in FIG. 3 comprises flip-flop 419 in FIG. 4. Thus, the 76.8 kHz. signal from flip-flop 413 is presented to gate 415 which through gate 417 enables flip-flop 419. The output thereof, i.e., signals $C_4$ and $\overline{C}_4$, are the 38.4 kHz. signals for subsequent circuit operation.

The divide circuits 305, and 307 in FIG. 3 are also shown in FIG. 4. Flip-flop 423 comprises the divide by two circuit 305. The $C_{4AD}$ signal applied to the flip-flop 423 is the 38.4 kHz. signal with the pulse added or deleted as shown in FIG. 3. Thus, flip-flop 423 in conjunction with gate 421 and the $C_{4AD}$ signal generates the $C_5$ and $\overline{C}_5$ operating signals. The divide by 16 network 307 in FIG. 3 comprises flip-flops 429, 435, 439, and 445. Thus, flip-flop 429 in conjunction with gates 425 and 427 generates signals $C_6$ and $\overline{C}_6$. Flip-flop 435 in conjunction with gates 431 and 433 generates the $C_7$ and $\overline{C}_7$ signals. Flip-flop 439 and flip-flop 445 in conjunction with gates 437, 441, and 443 generate signals $C_8$, $\overline{C}_8$, and $C_9$, $\overline{C}_9$, respectively.

Figure 5:
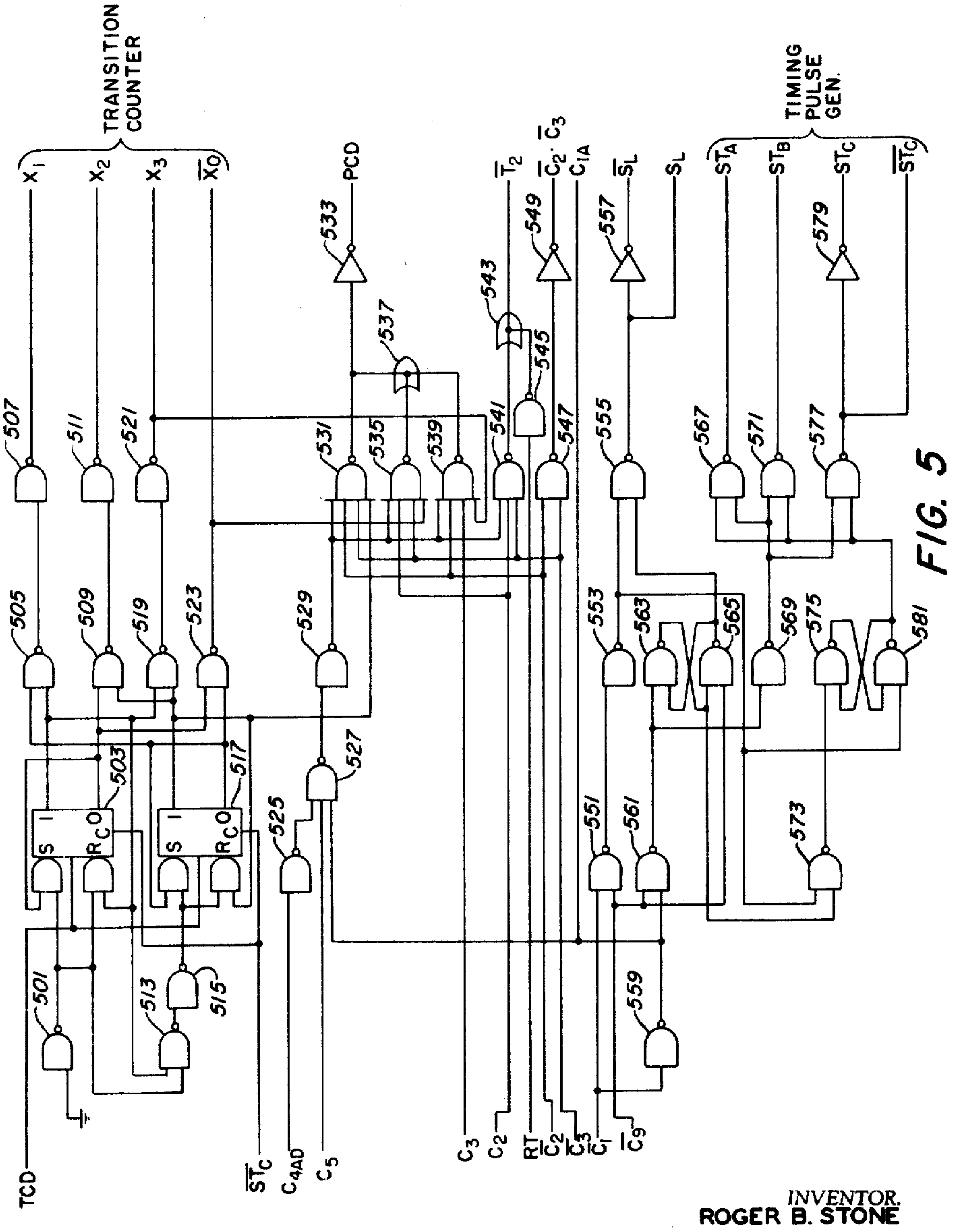
FIG. 5 is a logic circuit diagram for the bit sync transition counter and timing pulse generator.

Referring now to FIG. 5, there is shown the timing pulse generator 311, the pulse control box 313, and the transition pulse counter 315, as seen in FIG. 3. The transition pulse counter 315 is located at the top of FIG. 5 and comprises the flip-flops 503 and 517. The input signals to the transition counter are applied on the line labeled TCD which are the transition pulses as detected by prior circuitry, not shown. Flip-flop 503 in conjunction with gate 501 and flip-flop 517 in conjunction with gates 513 and 515, generate the counting signals for application to subsequent gating circuitry. Thus, with the proper signals as shown from the flip-flops, gates 505 and 507 generate the signal $X_1$, gates 509 and 511 generate signal $X_2$, gates 519 and 521 generate signal $X_3$, while gate 523 generates signal $\overline{X}_0$. The signal $X_1$ denotes a count of one transition, signal $X_2$ denotes a double transition count, signal $X_3$ denotes a triple transition count, while $\overline{X}_0$ denotes no transitions. The signal $\overline{ST}_c$ as a clear signal to flip-flops 503 and 517 resets the transition counter after every baud time.

As seen in FIG. 3, signals $T_{c_1}$, $T_{c_2}$ and $T_{c_3}$ are applied to the pulse control circuit 313. In FIG. 5, the pulse control box comprises gates 531, 535, 539, 541, 545, 547, and inverter 533. Also as seen in FIG. 3, signals $T_1$, $T_2$, and $T_3$ are applied to the pulse control circuit 313 from the timing pulse generator. In FIG. 5 it can be seen that pulse $C_5$ is presented to gate 527, $C_3$ is applied to gate 539, signal $C_2$ is applied to gate 541, and signals $\overline{C}_2$ and $\overline{C}_3$ are applied to gate 547. In conjunction with the $C_{4AD}$ signal applied to gate 525, the pulse control box 313 generates the PCD signal which is the position counter drive signal to drive the position counter 319 in accordance with the number of transitions detected at the transition pulse counter 315. In addition, gate 541 and gate 545 in conjunction with an OR function 543 generates a $\overline{T}_2$ signal for application to subsequent circuitry. Similarly, gate 547 through inverter 549 generates $\overline{C}_2$ and $\overline{C}_3$, for subsequent circuit operation.

The timing pulse generator 311 is located at the bottom of FIG. 5. With the application of signals $\overline{C}_1$ and $\overline{C}_9$ the timing pulse generator comprising gates 551 through 581 generates the sampling signals $S_L$ and $\overline{S}_L$ and the timing pulse signals $ST_a$, $ST_b$, $ST_c$, and $\overline{ST}_c$.

Figure 6:
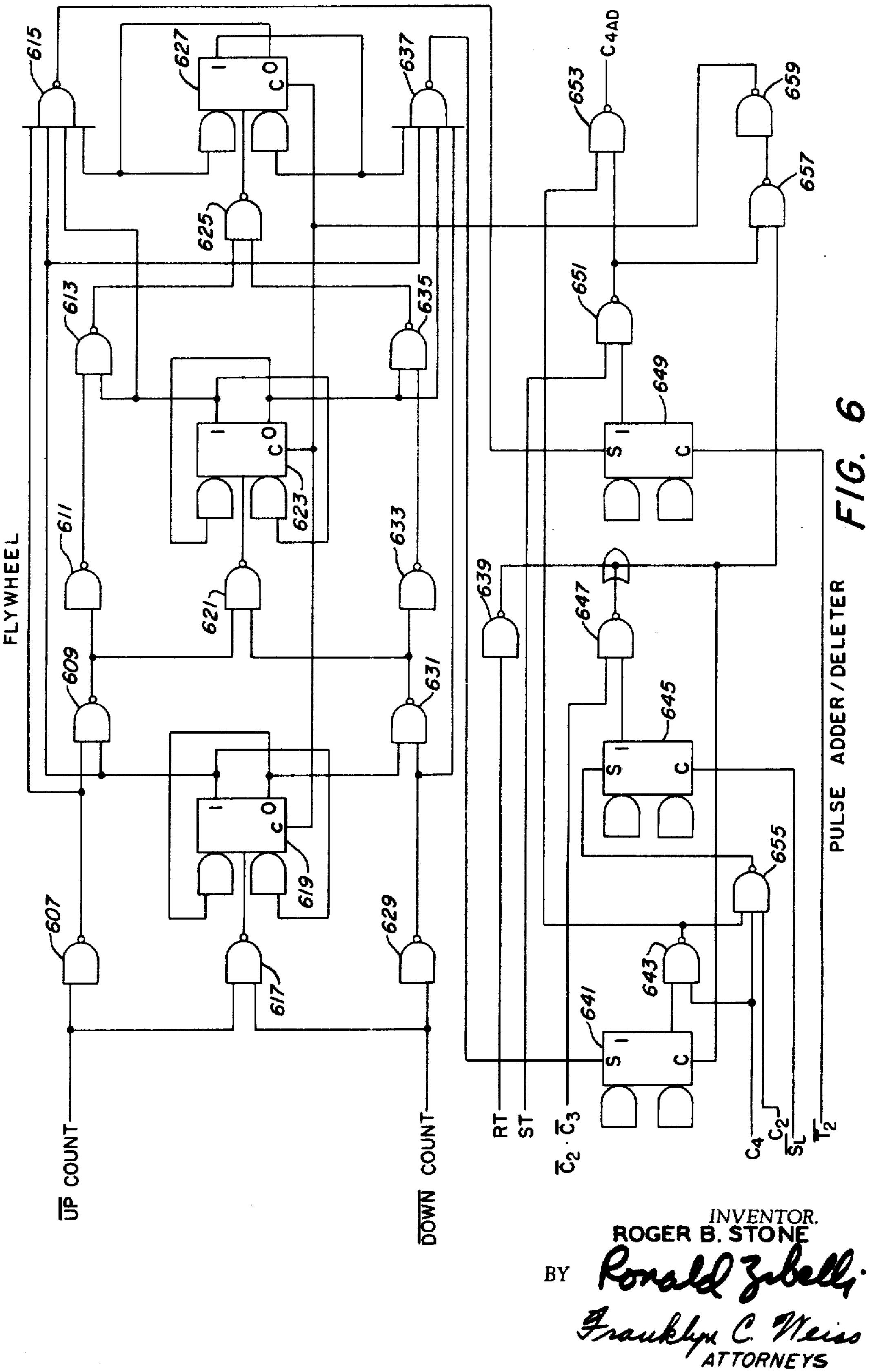
FIG. 6 is the representative logic diagram for bit sync, flywheel, and pulse shifter circuits.

FIG. 6 shows the flywheel circuit 321 and the pulse adder or deleter circuit 309 as seen in FIG. 3. The flywheel circuit, as hereinbefore set forth, receives the up count and down count signals from the early or late decision circuit 317 and is utilized to act as a buffer network in order to remove the possibility that noise or jitter has caused erroneous transition information. While this particular circuit uses a count from −4 to +4, the circuit must provide for an actual continuous count of 8. For such a count of 8, therefore, a three-stage counter is utilized and comprises flip-flops 619, 623, and 627. The up count signal is received at gates 607 and 617, while the down count signal is received at gates 629 and 617. The outputs of flip-flop 619 are presented to gates 609 and 631 in addition to gates 615 and 637. The second stage, flip-flop 623, in conjunction with gate 621 generates signals for application to gates 613 and 635. The other inputs to gates 613 and 635 are the outputs from gates 611 and 633 respectively.

Flip-flop 627, in conjunction with gates 625, 615, and 637, generates the add or delete signal for presentation to the pulse adder or deleter circuit 309 which in FIG. 6 is at the lower part of the figure. The signals as presented to the pulse adder or deleter circuit is as follows. Signal RT is a request to transmit signal which is utilized to disable the circuits for utilization as a pure divide down network and not to be utilized for bit sync with the addition or deletion provision. Signal ST is a reset pulse utilized to reset the pulse adder or deleter circuit once every baud time. Signals $\overline{C}_2$ and $\overline{C}_3$ are signals generated at the pulse control circuit as shown in FIG. 5. Signal $C_4$ is the 38.4 kHz. signal from the divide by 2 network 303 as shown in FIGS. 3 and 4. $C_2$ is another clock signal generated at the divide by 3 network 301. Signal $\overline{S}_L$ is a reset signal to flip-flop 645 to reset the flip-flop every baud time. Signal $\overline{T}_2$ is a signal applied to reset flip-flop 649.

If the flywheel circuit determines that a signal should be deleted from the clock wave train, the output of gate 637 will set flip-flop 641. The output from gate 643 will enable gate 653 and gate 655. The other two inputs to gate 655 are the 38.4 kHz. signal in conjunction with the 76.8 kHz. signal, $C_2$. The action of these to input signals generates the signal edge necessary for operation of deleting or adding the signal in the clock wave train. Thus, gate 643 is utilized as a pulse delete gate while the gate 655 is utilized as the deleted pulse generator. Flip-flop 645 is utilized as a pulse delete reset control for enabling gate 647 as the reset pulse generator.

When the flywheel circuit determines that a pulse should be added to the wave train, the output of gate 615 sets flip-flop 649. Gate 651 in conjunction with the reset pulse ST is utilized as the add pulse generator for presentation to reset pulse combiner gate 657 and pulse add gate 653. Gate 659 is utilized as an inverter. The output therefore, from gate 653 is the $C_{4AD}$ signal which is the output from pulse adder or deleter circuit 309 in FIG. 3 which contains the added or deleted clock pulse in accordance with the principles of the present invention.

Figure 7:
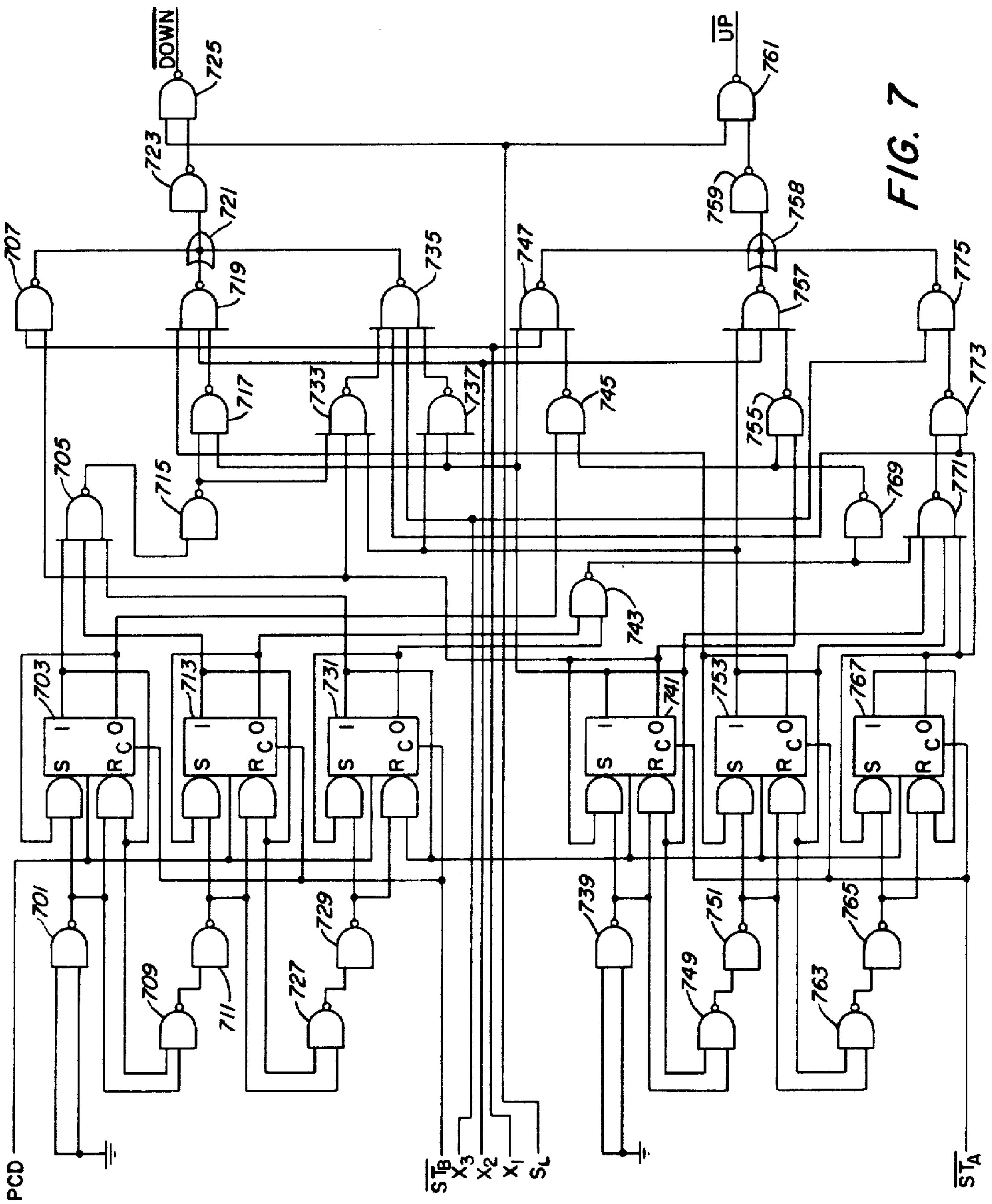
FIG. 7 is the representative logic circuitry for the bit sync position counter and decode matrix.

FIG. 7 includes the circuitry for the position counter 319 and the early or late decision box 317. The inputs to the circuit are as follows. The signal PCD is the position counter drive signal as described above in conjunction with FIG. 5. Signals $\overline{ST}_a$ and $\overline{ST}_b$ are reset signals in accordance with the timing relationship of the various circuits. As hereinbefore set forth, signal $X_1$ denotes one transition detected, signal $X_2$ denotes a double transition detected, and $X_3$ denotes a triple transition detected. Signal SL is the sample pulse utilized for energizing the circuit. The position counter comprises flip-flops 703, 713, 731, 741, 753, and 767 which provides the binary count from $2^0$ to $2^5$. Thus, gates 701, 709, 711, 727, 729, 739, 749, 751, 763, and 765 operate as necessary for the counting function. The outputs from the counters are presented to a gate decode matrix for decoding specific predetermined counts for determining the generation of a down or up signal for presentation to the flywheel 321. Gate 707 is utilized as the 7 or less and the single transition case detector. Gates 705, 717, 719, 733, 735, 737, are part of the less than 23 count detector. Gates 721, 723, and 725, are the divide down condition circuits. Gates 743, 769, 771, 773, and 775 are concerned with the more than 17 and more than 25 count detectors. Gates 755, 757 are concerned with the more than 25 detector and transition detector. Gates 758, 759, and gate 761 generate the up signal to the flywheel in conjunction with the operation of the position counter and early or late decision circuitry.

In the foregoing, there have been disclosed methods and apparatus for determining the bit synchronization of synchronous digital transmitted information. The circuitry was described in conjunction with a four-level signal, but it is obvious, however, that such four data levels are exemplary only, as any number of levels could be utilized in a similar manner in accordance with the the principles of the present invention. In addition, the circuitry was described in conjunction with certain clock pulse rates, but one skilled in the art may, as hereinbefore described, utilize the present invention with any predetermined clock rate and associated divide down networks. The circuit has utility in not only the frequency shift keyed system disclosed, but in other systems in which bit synchronization is required for the transmitted synchronous digital data. Facsimile transmission systems, for example, utilizing the frequency modulation technique would advantageously use the disclosed invention in the demodulation and detection of the transmitted information. Thus, while the present invention, as to its objects and advantages, as described herein, has been set forth in specific embodiments thereof, they are to be understood as illustrative only and not limiting.

What is claimed is:

1. In a synchronous digital data transmission system where information of at least two data levels is transmitted at a predetermined baud rate, the method of recovering the synchronization of the transmitted synchronous digital data comprising:
   - generating local clock signals at a predetermined multiple of said baud rate,
   - counting said local clock signals occurring within one baud time,
   - deleting a clock pulse in said clock signals when less than half the number of clock signals have been counted at a sampling time determined by the end of a baud,
   - adding a clock pulse in said clock signals when more than half the number of clock signals have been counted at a sampling time determined by the end of the baud, and
   - dividing said clock signals by said predetermined multiple rate to generate the local baud sampling clock.

2. The method as set forth in claim 1 wherein said step of counting said local clock signals comprises:
   - further counting the number of level transitions made by said digital data, and
   - averaging the number of clock signals being counted by the number of crossed data levels in one baud time to determine time relationship of the center of the level transitions.

3. In a synchronous digital data transmission system wherein information of at least two data levels is transmitted at a predetermined baud rate, the method of recovering the synchronization of the transmitted synchronous digital data comprising:
   - generating local clock signals at a predetermined multiple of said baud rate,
   - counting said local clock signals occurring within one baud time,
   - adding or deleteing a clock pulse in said clock signals when more or less, respectively, than half the number of clock signals have been counted at a sampling time determined by the end of a baud, and
   - dividing said clock signals by said predetermined multiple rate to generate the local baud sampling clock.

4. In a synchronous digital data transmission system where information of at least two data levels is transmitted at a predetermined baud rate, the method of recovering the synchronization of the transmitted synchronous digital data comprising:
   - generating local clock signals at a predetermined multiple of said baud rate,
   - counting said local clock signals occurring within one baud time,
   - deleting a clock pulse in said pulse signals when less than half the number of clock signals have been counted at a sampling time determined by the end of a baud, and
   - dividing said clock signals by said predetermined multiple rate to generate the local baud sampling clock.

5. In a synchronous digital data transmission system wherein information of at least two data levels is transmitted at a predetermined baud rate, the method of recovering the synchronization of the transmitted synchronous digital data comprising:

generating local clock signals at a predetermined multiple of said baud rate,
counting said local clock signals occurring within one baud time,
adding a clock pulse in said clock signals when more than half the number of clock signals have been counted at a sampling time determined by the end of a baud, and
dividing said clock signals by said predetermined multiple rate to generate said local baud sampling clock.

6. In a synchronous digital data system wherein information of at least two data levels is transmitted at a predetermined baud rate, a bit sync recovery system comprising:
clock pulse generating means for generating local clock signals at a predetermined multiple of said baud rate,
first counter means for counting the number of slicing levels crossed by the level transitions made by said digital data,
pulse control means coupled to said clock pulse generating means and said first counter means for increasing the number of clock signals by a factor equal to the number of level transitions counted by said first counter means within one baud time,
second counter means coupled to said pulse control means for counting said clock signals produced thereby,
circuit means coupled to said first and second counter means for adding or deleting a clock pulse in said clock signals when more or less, respectively, than half the number of clock signals have been counted at a sampling time determined by the end of the baud, and
divide means coupled to said clock pulse generating means for dividing said clock signals by said predetermined multiple rate to generate the local baud sampling clock, said local baud sampling clock being shifted in phase by the reciprocal of said predetermined multiple rate clock signals.

7. A synchronous digital data transmission system comprising
means for transmitting synchronous digital data of at least two data levels at a predetermined baud rate,
means for receiving said synchronous digital data, said receiving means comprising
circuit means for determining the average time position of the transitions between data levels in said synchronous digital data, clock pulse generating means for generating local clock signals at a predetermined multiple of said baud rate,
means coupled to said circuit means and said clock pulse generating means to add or delete a clock pulse in said local clock signals in accordance with the average time position of said data level transitions, and
divide circuit means coupled to said clock pulse generating means for dividing said clock signals by said predetermined multiple rate to generate a local baud clock, said local baud clock being shifted in phase by the reciprocal of the predetermined multiple rate clock signals.

8. A system for recovering the phase of a synchronous clock in a synchronous digital data transmission system wherein said digital data is transmitted at a predetermined baud rate comprising
clock pulse generating means for generating local clock signals at a predetermined multiple of said baud rate, counter means coupled to said clock pulse generating means for counting said local clock signals occurring within one baud time,
circuit means coupled to said counter means for adding or deleting a clock pulse in said clock signals when more or less, respectively, than half the number of clock signals have been counted at a sampling time determined by the end of a baud, and
divide means coupled to said clock pulse generating means for dividing said clock signals by said predetermined rate to generate the local baud clock.

9. The system as defined in claim 8 further including
second counter means for counting the number of level transitions made by said digital data within one baud time,
means coupled to said second counter means and said clock pulse generating means for averaging the time relationship within said one baud time of the occurrence of the number of level transitions counted, and
decision circuit means coupled to said first mentioned counter means and said second counter means for controlling said adding or deleting circuit means in response to the averaged time relationship of said counted level transitions.

10. The system as defined in claim 9 further including flywheel circuit means coupled between said decision circuit means and said adding or deleting circuit means for delaying the operations of said adding or deleting circuit means until a predetermined number of add indications or a predetermined number of delete indications at the upper and lower limits, respectively, of said flywheel circuit are received from said decision circuit means.

11. In a synchronous digital data transmission system wherein information of at least two data levels is transmitted at a predetermined baud rate, a bit sync recovery system comprising
means for generating local clock signals at a predetermined multiple of said baud rate,
means for counting the number of level transitions made by said digital data within one baud time,
means coupled to said generating means and said counting means for averaging the time relationship within said one baud time the occurrence of the number of level transitions counted,
means for dividing said clock signals by said predetermined multiple rate to generate a local baud clock, and
means responsive to said averaging means for shifting the phase of said local baud clock by an amount equal to the reciprocal of said predetermined multiple rate clock signals, said shift being leading or lagging when said time relationship of the average of the number of counted level transitions is before or after, respectively, the middle of the baud time.

References Cited

UNITED STATES PATENTS

| | | | |
|---|---|---|---|
| 3,418,637 | 12/1968 | Humphrey | 340—172.5 |
| 3,435,424 | 3/1969 | Schira et al. | 340—172.5 |

OTHER REFERENCES

I.B.M. Technical Disclosure Bulletin, vol. 5, No. 2, pp. 65–66, July 1962, W. L. Stahl, Data Sampling Method.

RAULFE B. ZACHE, Primary Examiner